(12) United States Patent
Han (10) Patent No.: US 12,233,953 B2
(45) Date of Patent: Feb. 25, 2025

(54) STEERING APPARATUS FOR VEHICLE

(71) Applicant: HL MANDO CORPORATION, Pyeongtaek-si (KR)

(72) Inventor: Jeonghwa Han, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 475 days.

(21) Appl. No.: 17/673,794

(22) Filed: Feb. 17, 2022

(65) Prior Publication Data
US 2022/0258790 A1 Aug. 18, 2022

(30) Foreign Application Priority Data
Feb. 18, 2021 (KR) .................. 10-2021-0022076

(51) Int. Cl.
| | |
|---|---|
| *B62D 3/12* | (2006.01) |
| *B62D 5/04* | (2006.01) |
| *F16H 25/22* | (2006.01) |
| *F16H 25/24* | (2006.01) |
| *F16H 55/14* | (2006.01) |
| *F16H 25/20* | (2006.01) |

(52) U.S. Cl.
CPC ............. *B62D 3/12* (2013.01); *B62D 5/0427* (2013.01); *B62D 5/0448* (2013.01); *F16H 25/2204* (2013.01); *F16H 25/24* (2013.01); *F16H 55/14* (2013.01); *F16H 2025/2081* (2013.01); *F16H 2025/2096* (2013.01)

(58) Field of Classification Search
CPC . B62D 5/0472; B62D 5/0448; F16H 25/2204; F16H 25/24; F16H 55/14; F16H 2025/2081; F16H 2025/2096
See application file for complete search history.

(56) References Cited

U.S. PATENT DOCUMENTS

2015/0060187 A1* 3/2015 Yamaguchi .......... B62D 5/0445
180/444

FOREIGN PATENT DOCUMENTS

| DE | 102016103197 A1 * | 8/2017 | .......... B62D 5/0427 |
| KR | 2014104866 A * | 8/2014 | |
| KR | 2021158079 A * | 12/2021 | .............. B62D 3/08 |

* cited by examiner

*Primary Examiner* — Jacob D Knutson
(74) *Attorney, Agent, or Firm* — WOMBLE BOND DICKINSON (US) LLP (57) ABSTRACT

The present embodiments provide a steering apparatus for vehicle including a motor pulley coupled to the rotation shaft of the driving motor, a nut pulley coupled to the outer circumferential surface of the ball nut, a belt connecting the motor pulley and the nut pulley, a first groove provided on an outer peripheral surface of at least one of the motor pulley and the nut pulley, a second groove provided on an inner surface of the belt at a position opposite to the first groove, and a slip preventing member coupled to the first groove.

15 Claims, 12 Drawing Sheets

STEERING APPARATUS FOR VEHICLE

CROSS REFERENCE TO RELATED APPLICATION

This application claims priority from Korean Patent Application No. 10-2021-0022076, filed on Feb. 18, 2021, which is hereby incorporated by reference for all purposes as if fully set forth herein.

Technical Field

The present embodiments relate to a steering apparatus for vehicle.

Related Art

In general, steering apparatus has been developed and applied to vehicle to provide convenience in driving operation by assisting a driver's steering wheel operation force, and power steering apparatus has been developed and applied in a hydraulic type using hydraulic pressure, an electro-hydraulic type using hydraulic pressure and electric power of the motor at the same time, and an electric type using only the electric power of the motor.

Recently, instead of removing a mechanical connection device such as a steering column or a universal joint or a pinion shaft between the steering wheel and the wheel, a steer-by wire apparatus that uses an electric motor has been developed and applied.

Electric or steer-by-wire steering apparatus is a driving means that generates power by being controlled by an electronic control unit (ECU) that determines the steering degree of the steering wheel through a torque sensor. It consists of a rack bar that moves the connected tie rod and a driven means that receives the rotational force of the driving means and converts it into an axial movement force to the rack bar and transmits it.

Here, the driving means comprising an electric motor controlled by an electronic control unit (ECU), a motor pulley fixed to the shaft of the electric motor, and a belt wound around the motor pulley. The driven means comprising a ball nut surrounding the rack bar, and a nut pulley coupled to the outer peripheral surface of the ball nut and wound around a belt.

In general, the belt connecting the motor pulley and the nut pulley is combined by press-fitting, and slipping of the belt occurs between the belt and the motor pulley or between the belt and the nut pulley, reducing the power transmission efficiency and reducing the power transmission efficiency of the belt. The movement may generate dust, and there is a problem of reducing the steering feel.

DETAILED DESCRIPTION OF THE INVENTION

Technical Problem

The present embodiments prevent the left and right movement of the belt due to the slip of the belt, and prevent the tooth jump between the motor pulley or the nut pulley and the belt. The present embodiments may provide a steering apparatus for a vehicle capable of increasing a driver's steering feel by reducing vibration and rattle noise generated during operation of the nut pulley.

Technical Solution

The present embodiments provide a steering apparatus for vehicle including a motor pulley coupled to the rotation shaft of the driving motor, a nut pulley coupled to the outer circumferential surface of the ball nut, a belt connecting the motor pulley and the nut pulley, a first groove provided on an outer peripheral surface of at least one of the motor pulley and the nut pulley, a second groove provided on an inner surface of the belt at a position opposite to the first groove, and a slip preventing member coupled to the first groove.

Advantageous Effects

According to the present embodiments, there may be provided a steering apparatus for a vehicle that prevents the left and right movement of the belt due to the slip of the belt and prevents the tooth jump between the motor pulley or the nut pulley and the belt. According to the present embodiments, there may be provided a steering apparatus for a vehicle capable of increasing a driver's steering feeling by reducing vibration and rattle noise generated during operation of the nut pulley.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
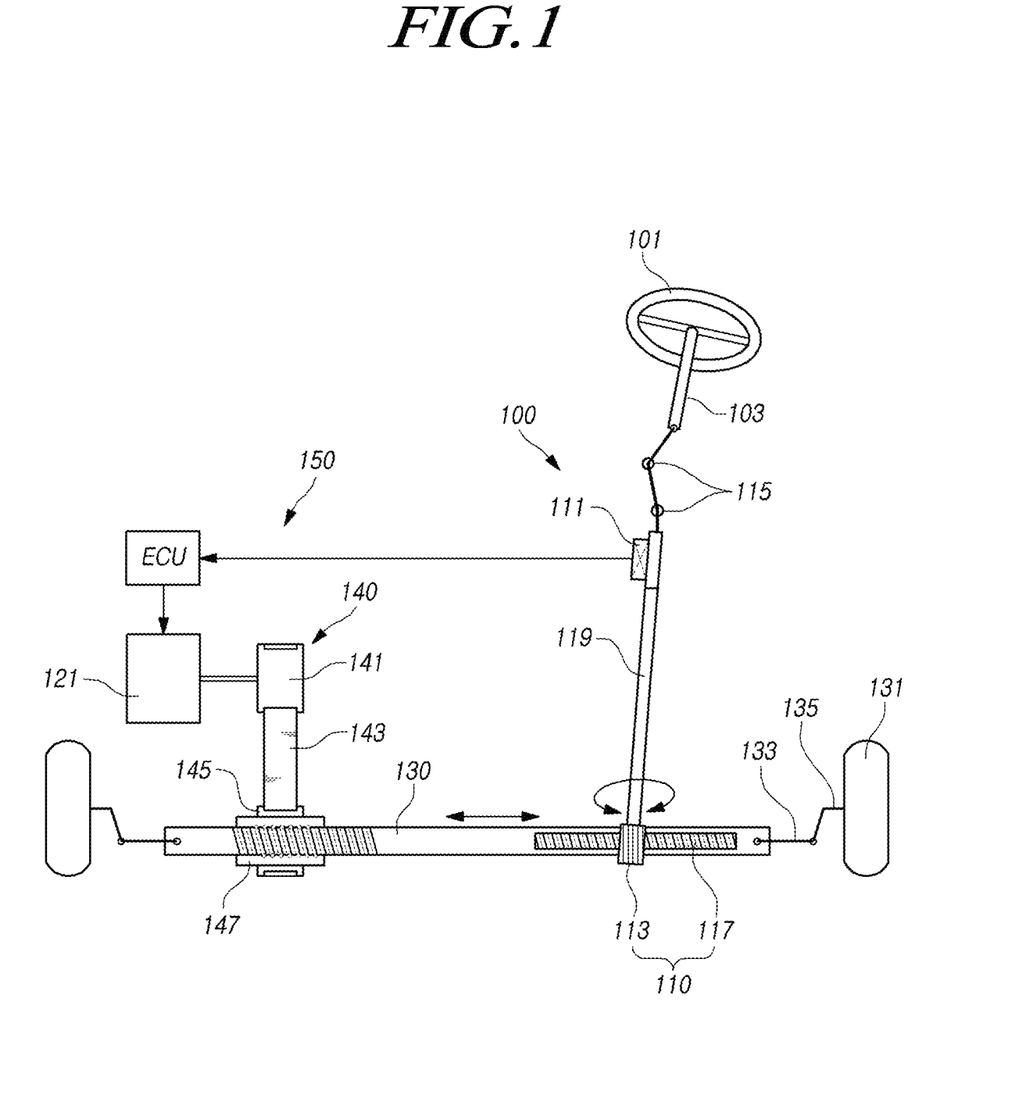
FIGS. 1 and 2 are schematic views showing a steering apparatus for vehicle in the present embodiments.
Figure 2:
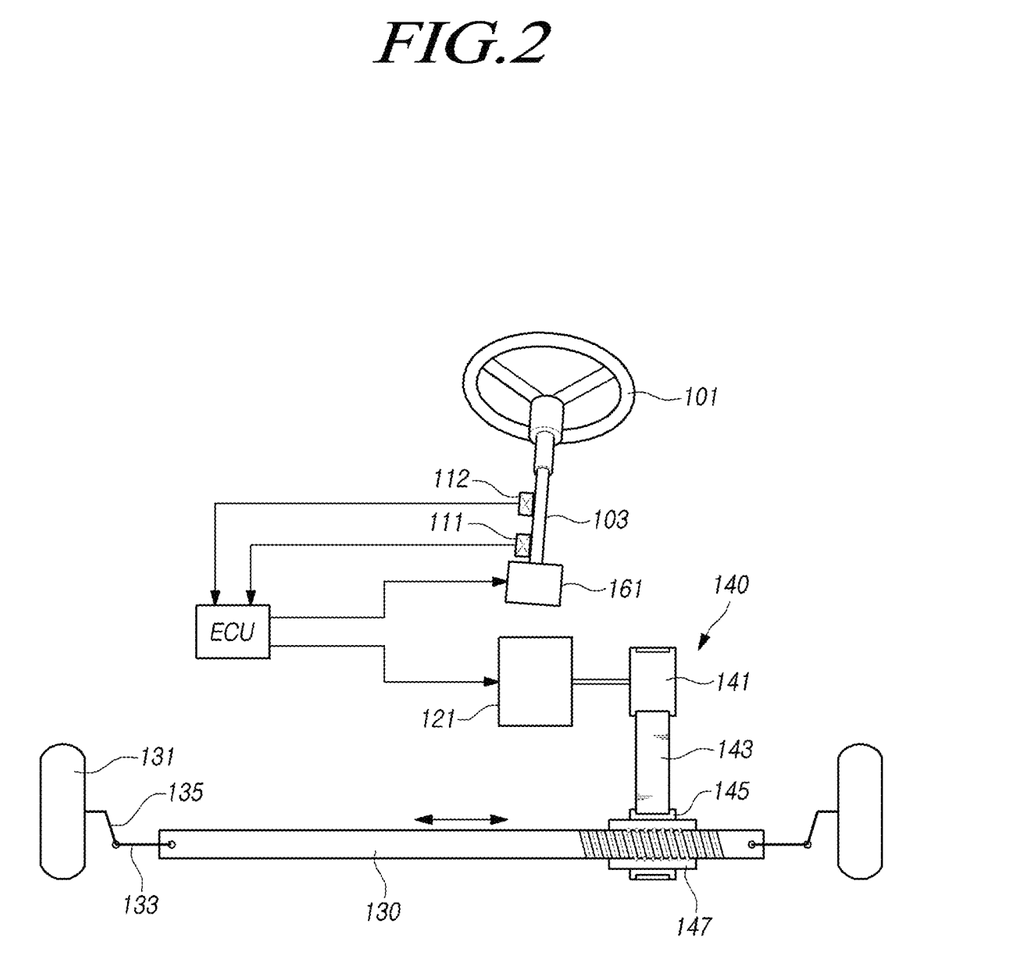
Figure 3:
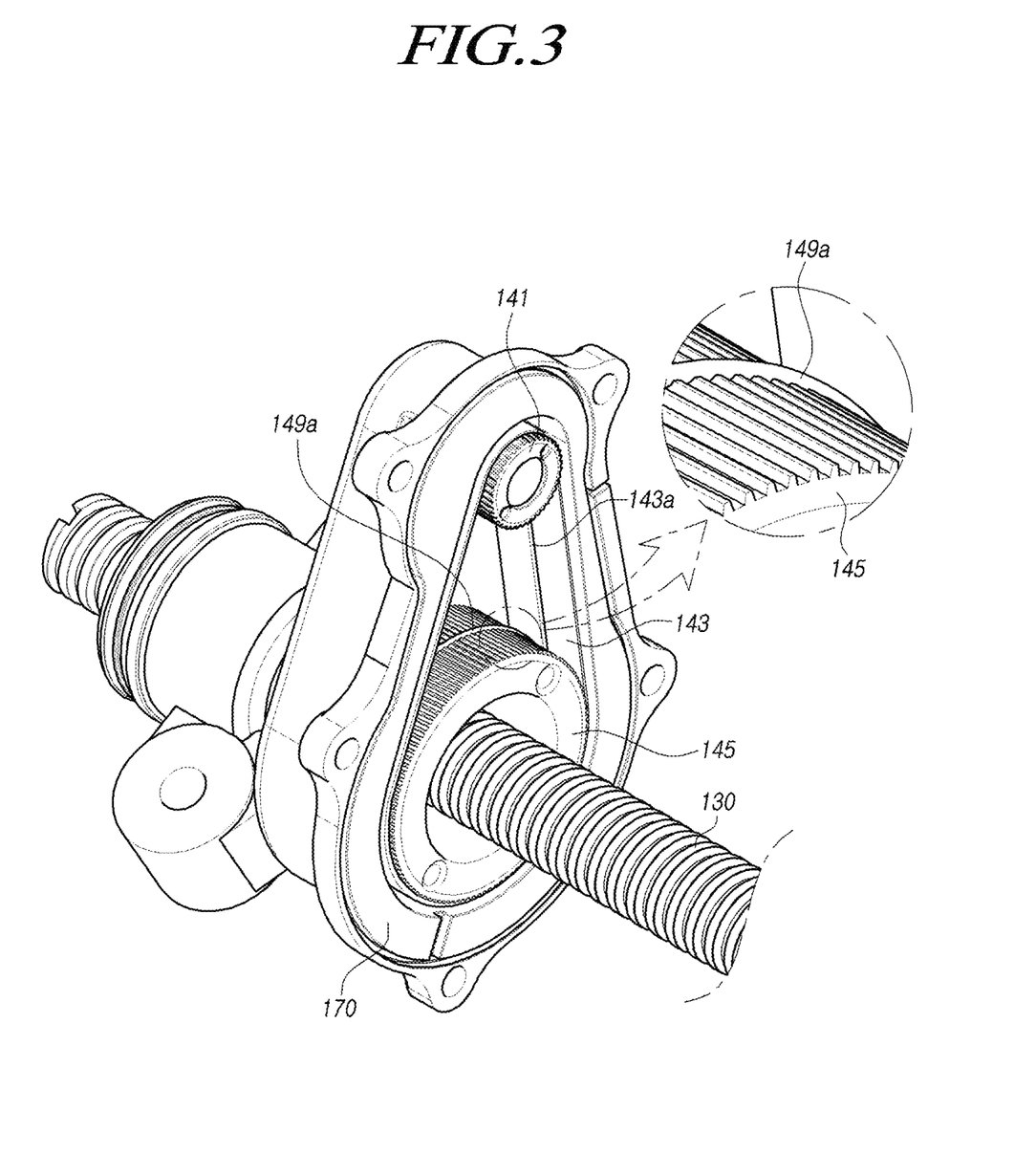
FIG. 3 is a perspective view showing a part of the steering apparatus for vehicle according to the present embodiments.
Figure 4:
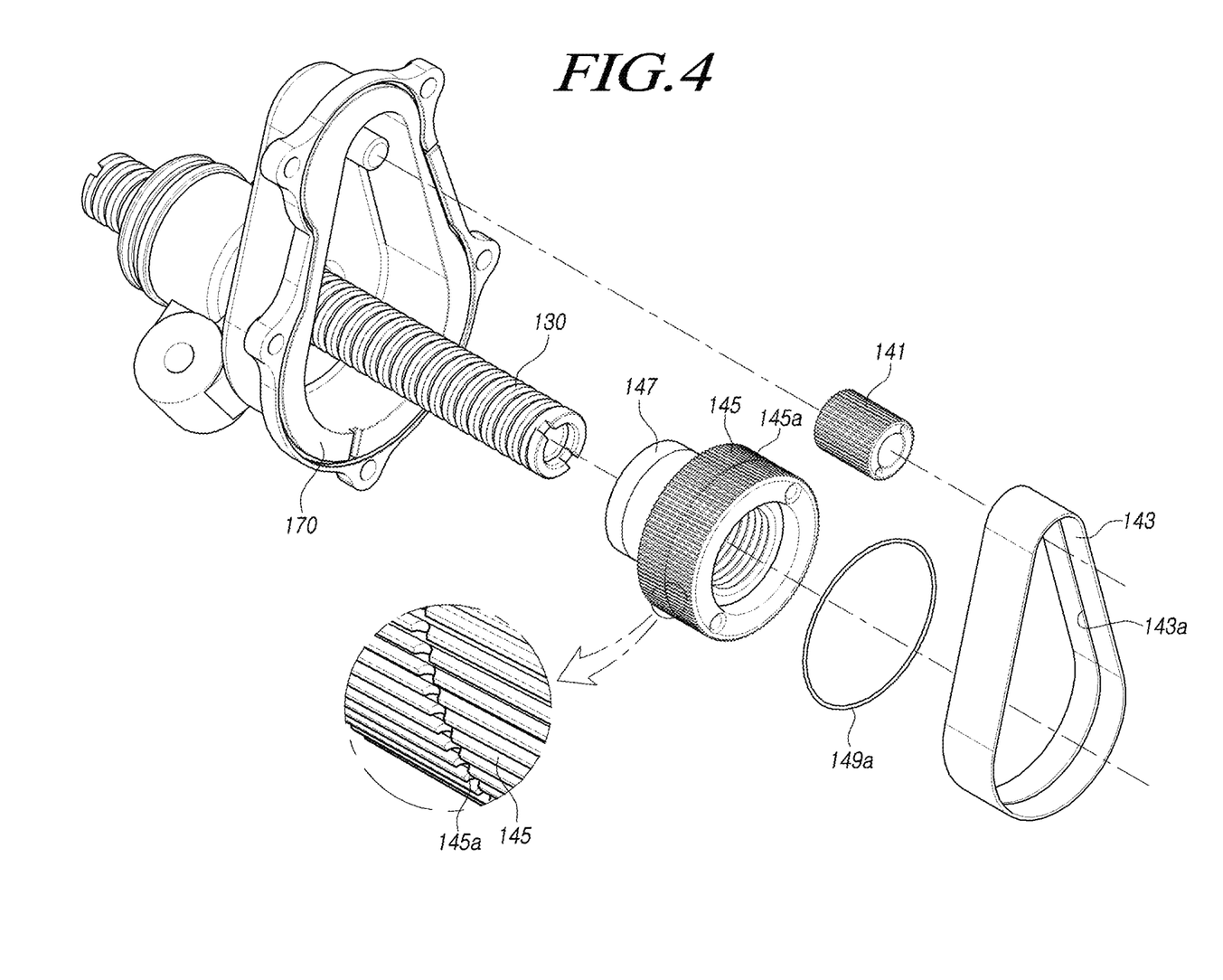
FIGS. 4 to 6 are exploded perspective views showing a part of the steering apparatus for vehicle according to the present embodiments.
Figure 5:
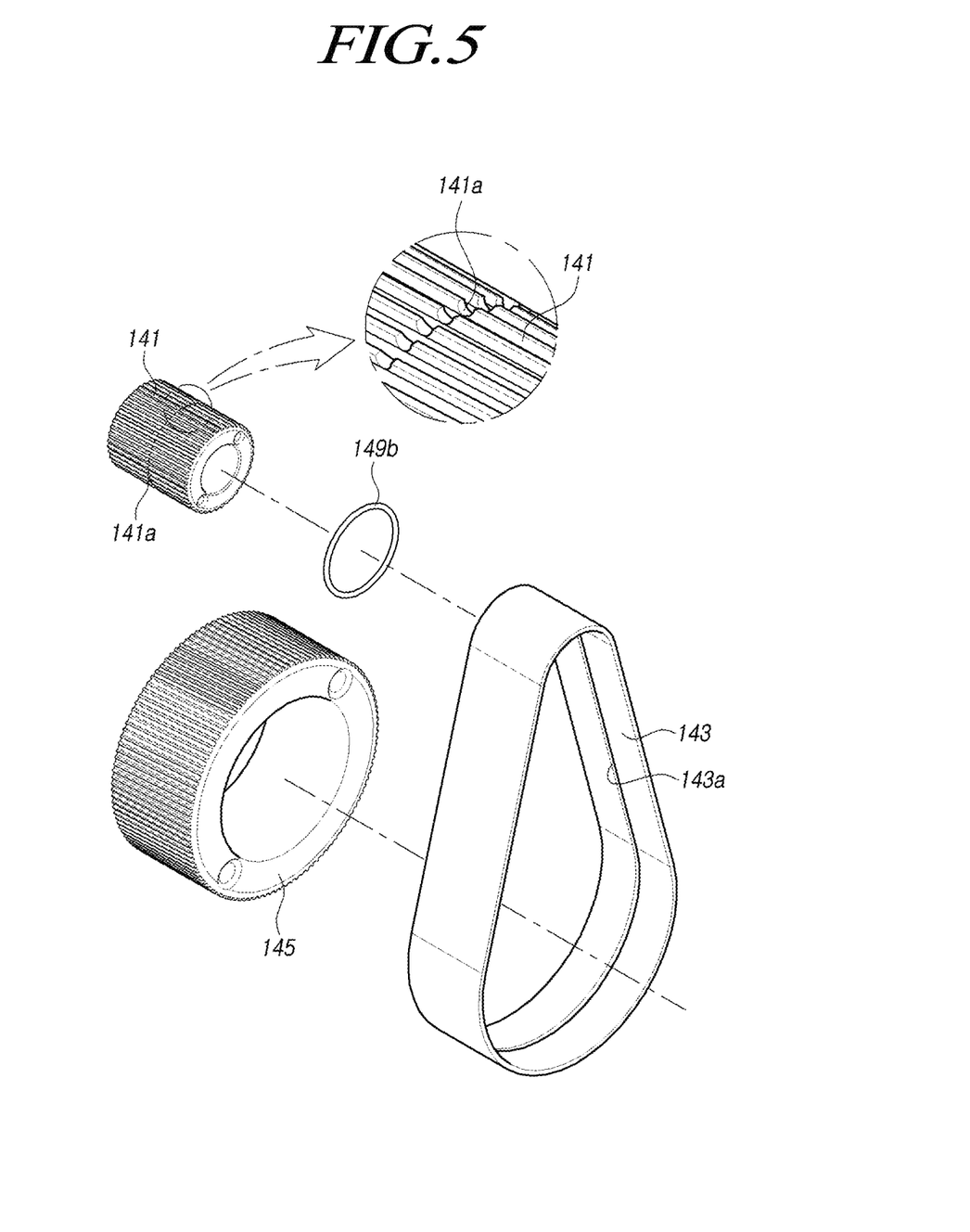
Figure 6:
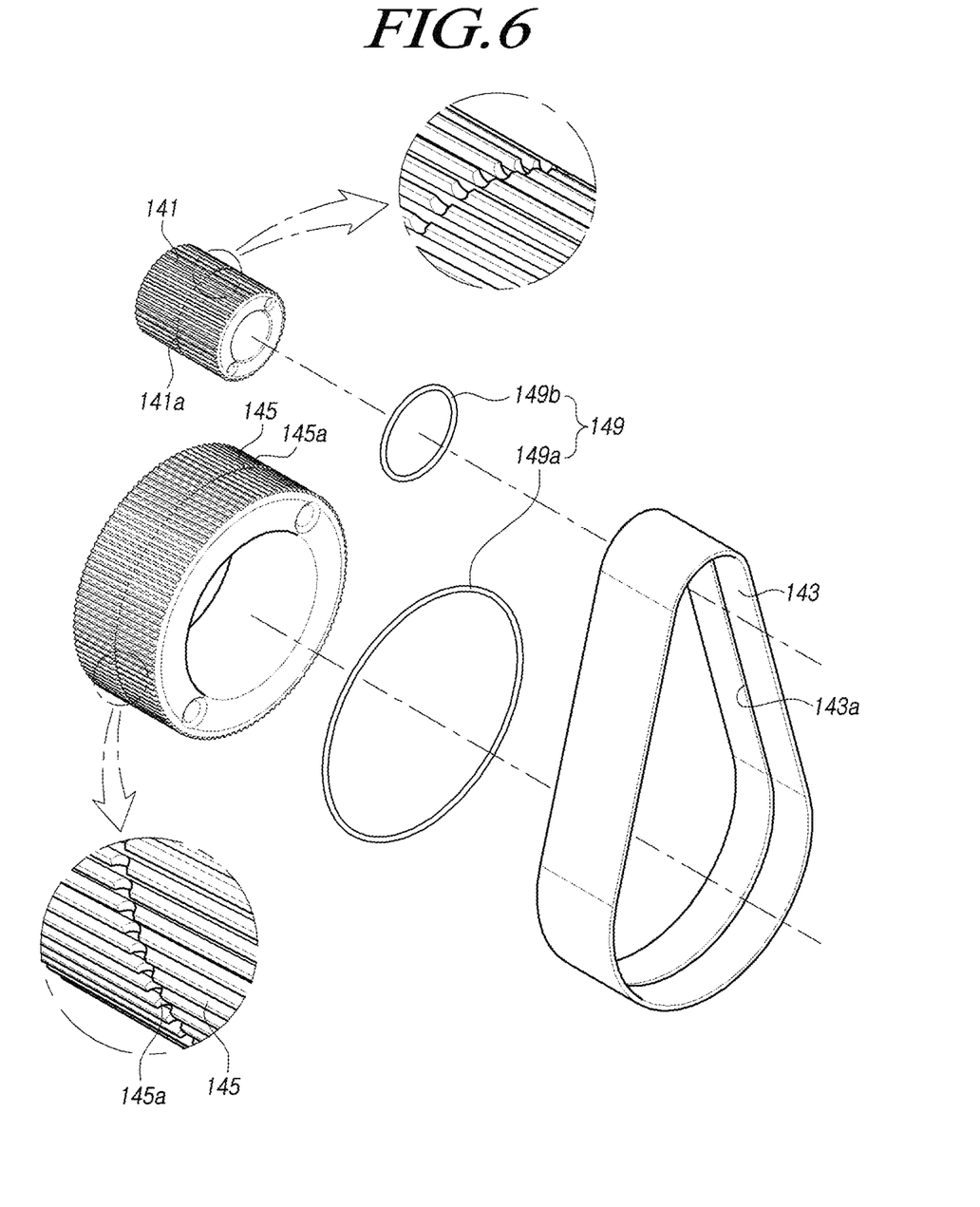
Figure 7:
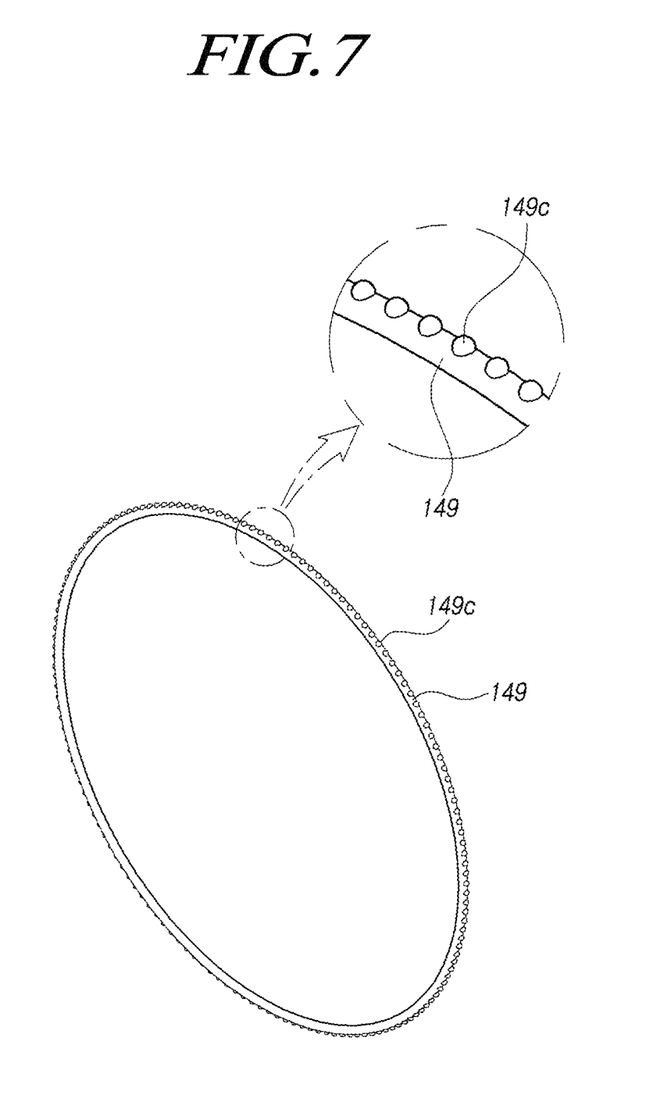
FIGS. 7 and 8 are perspective views showing a part of the steering apparatus for vehicle according to the present embodiments.
Figure 8:
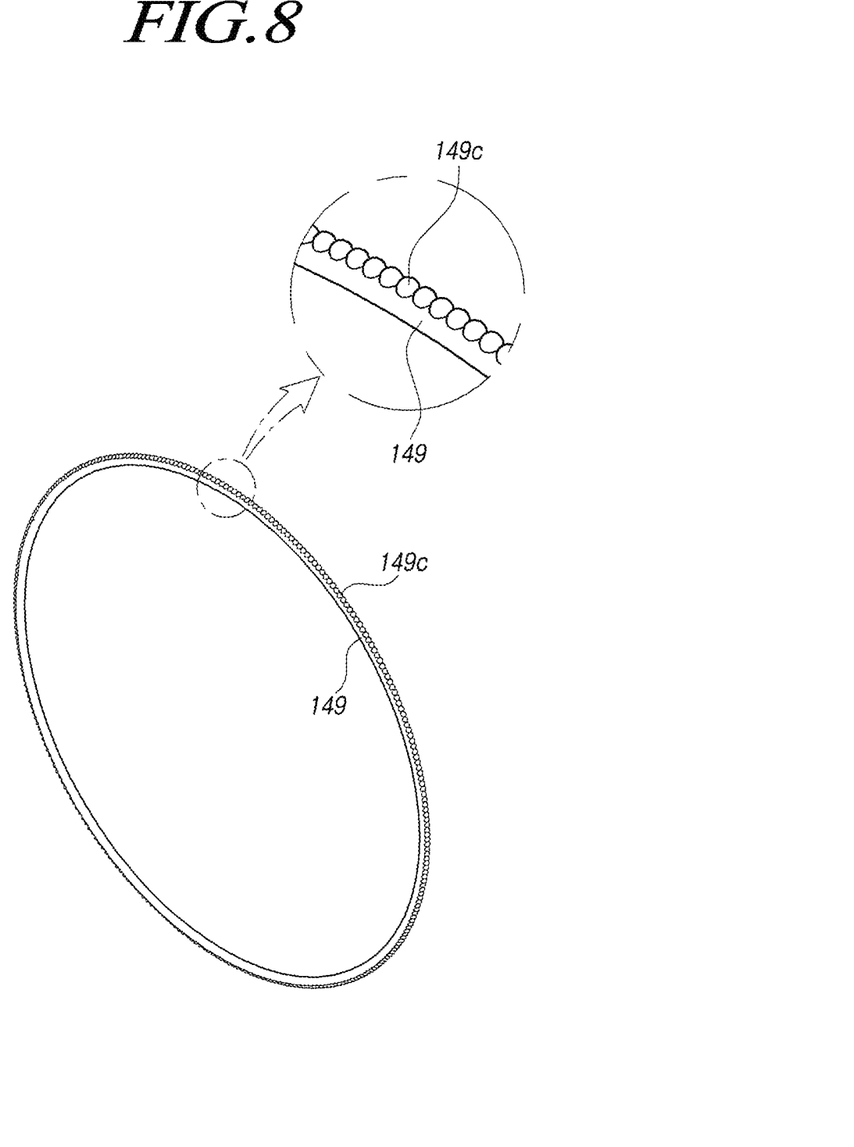
Figure 9:
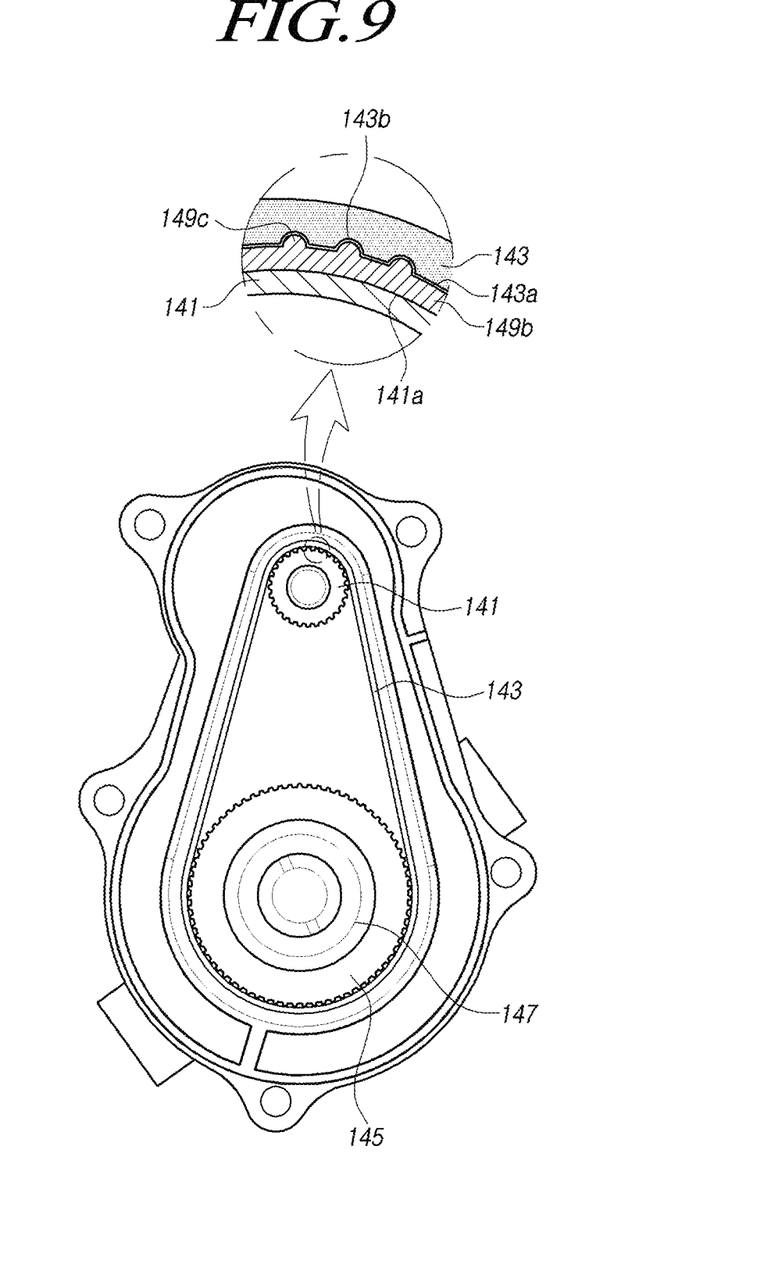
FIGS. 9 to 11 are a side view and a partially enlarged cross-sectional view showing a part of the steering apparatus for vehicle according to the present embodiments.
Figure 10:
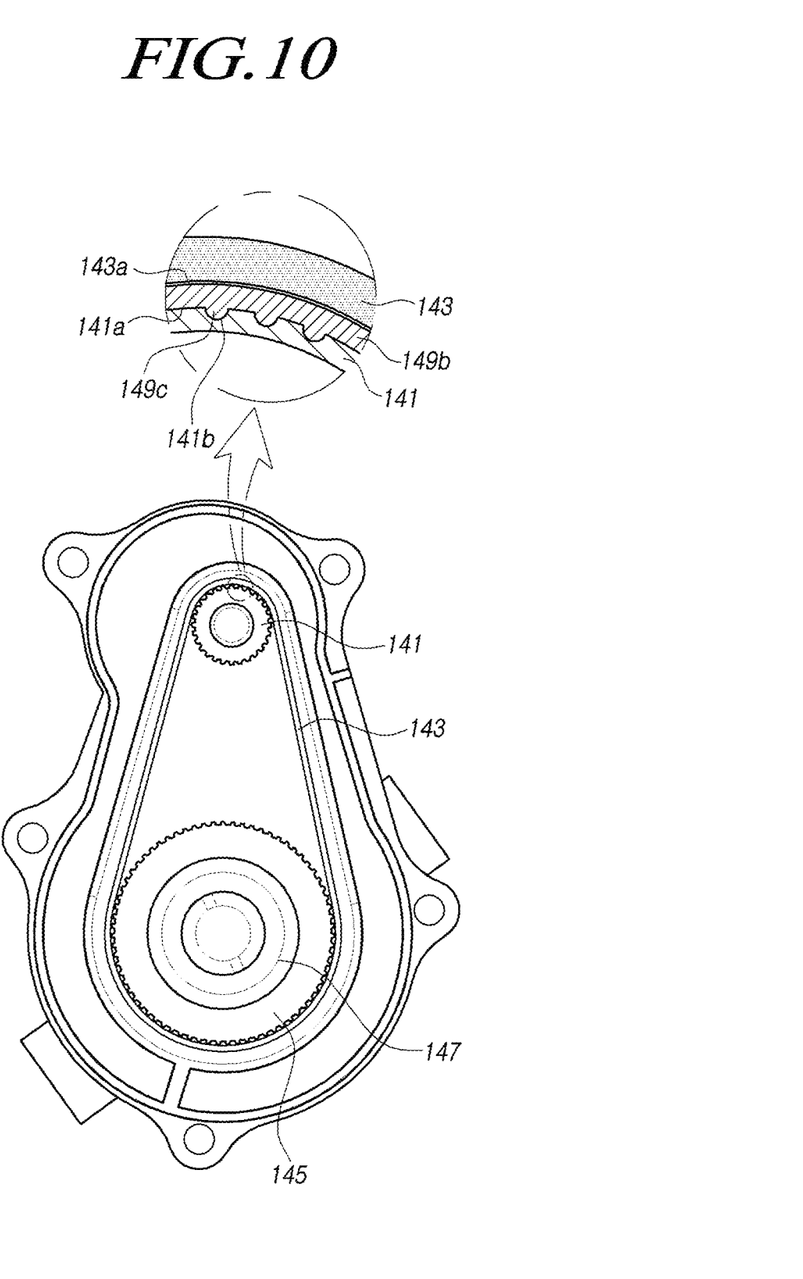
Figure 11:
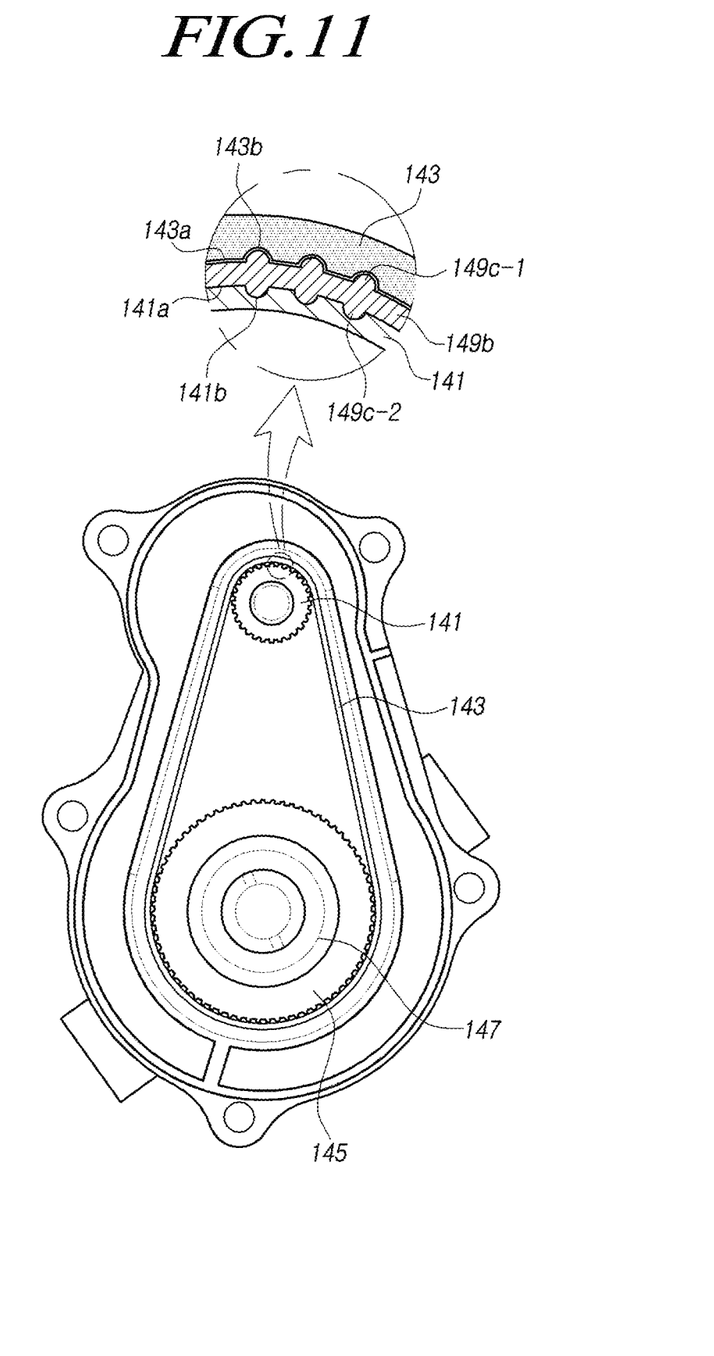
Figure 12:
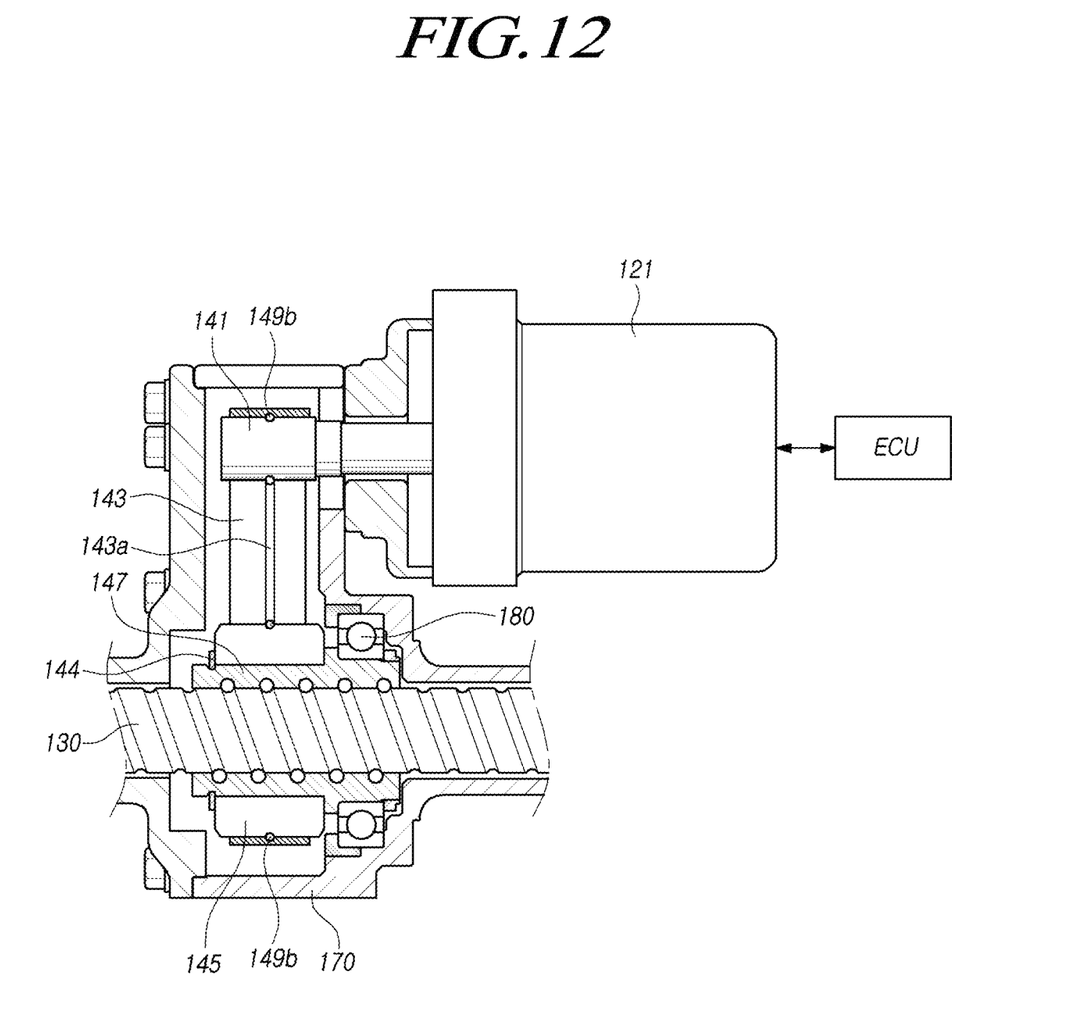
FIG. 12 is a partial cross-sectional view showing a part of the steering apparatus for vehicle according to the present embodiments.

FIGS. 1 and 2 are schematic views showing a steering apparatus for vehicle in the present embodiments. FIG. 3 is a perspective view showing a part of the steering apparatus for vehicle according to the present embodiments. FIGS. 4 to 6 are exploded perspective views showing a part of the steering apparatus for vehicle according to the present embodiments. FIGS. 7 and 8 are perspective views showing a part of the steering apparatus for vehicle according to the present embodiments. FIGS. 9 to 11 are a side view and a partially enlarged cross-sectional view showing a part of the steering apparatus for vehicle according to the present embodiments. FIG. 12 is a partial cross-sectional view showing a part of the steering apparatus for vehicle according to the present embodiments.

As illustrated in FIGS. 1 to 12, a steering apparatus for vehicle includes a motor pulley 141 coupled to a rotation shaft of a driving motor 121, a nut pulley 145 coupled to the outer circumferential surface of the ball nut 147, a belt 143 connecting the motor pulley 141 and the nut pulley 145, a first groove 141a, 145a provided on an outer peripheral surface of at least one of the motor pulley 141 and the nut pulley 145, a second groove 143a provided on an inner surface of the belt 143 at a position opposite to the first groove 141a, 145a, and an slip preventing member 149 coupled to the first groove 141a, 145a.

Referring to FIG. 1, the electric vehicle steering apparatus includes a steering system 100 and an auxiliary power mechanism 150 for supplying steering assistance power to the steering system 100.

The steering system 100 includes a steering shaft 103. The steering shaft 103 has an upper end connected to the steering wheel 101 and rotates together with the steering wheel 101, and the lower end is connected to the pinion shaft 119 via a pair of universal joints 115.

The rack-and-pinion mechanism unit 110 is formed by meshing the pinion gear 113 formed at the lower end of the pinion shaft 119 and the rack gear 117 formed on one outer peripheral surface of the rack bar 130 with each other.

Auxiliary power mechanism 150 includes a torque sensor 111 that detects a steering torque applied by the driver to the steering wheel 101 and outputs an electric signal proportional to the sensed steering torque, an electronic control unit (ECU) that generates a control signal based on an electrical signal transmitted from the torque sensor 111, a power motor 121 for generating steering assistance power based on a control signal transmitted from an electronic control unit (ECU), and belt-type transmission 140 for transmitting auxiliary power generated from the power motor 121 to the rack bar 130 via the belt 143.

Referring to FIG. 2, in the steer-by-wire vehicle steering apparatus, the angle sensor 112 and the torque sensor 111 are coupled to one side of the steering shaft 103 connected to the steering wheel 101, and the driver's steering When the wheel 101 is manipulated, the angle sensor 112 and the torque sensor 111 that detect it send electric signals to the electronic control unit (ECU) to operate the steering shaft motor 161 and the pinion shaft motor 121.

The electronic control unit (ECU) controls the steering shaft motor 161 and Controls the pinion shaft motor 121, based on the electric signals transmitted from the angle sensor 112 and the torque sensor 111 and the electric signals transmitted from various sensors mounted on the vehicle.

The pinion shaft motor 121 slides the rack bar 130 connected to the belt-type transmission 140 to steer the wheels 131 on both sides through the tie rod 133 and the nut arm 135. The steering shaft motor 161 generates a steering reaction force in the opposite direction when the driver manipulates the steering wheel 101 or performs steering of the steering shaft 103 during autonomous driving.

However, although FIG. 2 shows that the angle sensor 112 and the torque sensor 111 are provided on the steering shaft 103 for convenience of explanation, a motor position sensor for transmitting steering information to an electronic control unit (ECU) Of course, various radars, camera image sensors, etc. may be provided, and a detailed description thereof will be omitted below.

The same motor may be used for the power motor 121 of FIG. 1 and the pinion shaft motor 121 of FIG. 2. Hereinafter, the power motor 121 of FIG. 1 and the pinion shaft motor 121 of FIG. 2 are referred to as a driving motor 121 to describe embodiments.

Referring to FIGS. 1 to 4, the belt-type transmission 140 includes a motor pulley 141 fixed to the shaft of the driving motor 121, a ball nut 147 supporting the rack bar 130, a nut pulley 145 coupled to the outer peripheral surface of the ball nut 147, a belt 143 wound around the motor pulley 141 and the nut pulley 145, a rack housing 170 in which the motor pulley 141, the nut pulley 145, and the belt 143 are built-in.

The ball nut 147 is coupled with the rack bar 130 through a ball and rotates to slide the rack bar 130 from the inside of the rack housing 170, and a bearing 180 supporting rotation of the ball nut 147 is mounted on the outer peripheral surface of the ball nut 147.

The belt 143 connecting the motor pulley 141 and the nut pulley 145 of the belt-type transmission 140 is coupled by press-fitting, so that slip of the belt 143 may occur between the belt 143 and the motor pulley 141 or between the belt 143 and the nut pulley 145.

Referring to FIGS. 3 and 4, a first groove 145a may be provided on an outer circumferential surface of the nut pulley 145 in a circumferential direction. The first groove 145a may be provided in the center of the body of the nut pulley 145, but is not limited thereto. For example, the first groove 145a may be provided with a bias toward either one side or the other side of the nut pulley 145.

The belt 143 may be provided with a second groove 143a at a position opposite to the first groove 145a of the nut pulley 145. The second groove 143a may be provided at the center of the inner surface in the longitudinal direction of the belt 143, but is not limited thereto. For example, when the second groove 143a is provided with the first groove 145a biased toward any one side of the nut pulley 145, the second groove 143a moves to either one side or the other side of the belt 143. It may be provided with a bias.

A slip prevention member 149a may be coupled to the first groove 145a of the nut pulley 145, and the slip prevention member 149a may be provided to protrude in a radial direction than the body of the nut pulley 145.

The slip prevention member 149a is formed in a ring shape and may be fitted into the first groove 145a or may be integrally fused along the first groove 145a. In the present embodiments, the slip prevention member 149a is shown to be fitted into the first groove 145a as an example.

The slip prevention member 149a protrudes in a radial direction on the outer circumferential surface of the nut pulley 145, and the radially protruding portion of the slip prevention member 149a may be inserted and rotated along the second groove 143a of the belt 143. Therefore, slip between the nut pulley 145 and the belt 143 can be prevented by the slip prevention member 149a provided between the first groove 145a of the nut pulley 145 and the second groove 143a of the belt 143.

In this case, as shown in FIGS. 3 and 4, in general, flanges provided at both ends of the nut pulley 145 may be omitted in order to prevent slip between the nut pulley 145 and the belt 143.

FIG. 4 shows that only the nut pulley 145 is provided with the first groove 145a and the slip prevention member 149a coupled to the first groove 145a, but as shown in FIG. 5, only the motor pulley 141 may be provided with a first groove 141a and an slip prevention member 149b coupled to the first groove 141a.

Referring to FIG. 5, a first groove 141a may be provided on an outer circumferential surface of the motor pulley 141 in a circumferential direction. The first groove 141a may be provided in the center of the body of the motor pulley 141, but is not limited thereto. For example, the first groove 141a may be provided to be biased toward either one side or the other side of the motor pulley 141.

A second groove 143a may be provided on the inner surface of the belt 143 at a position opposite to the first groove 141a of the motor pulley 141. The second groove 143a may be provided at the center in the longitudinal direction of the belt 143, but is not limited thereto. For example, when the first groove 141a is provided with a bias toward one side of the motor pulley 141, the second groove 143a may be provided with a bias toward either side of the belt 143 opposite to this.

A slip prevention member 149b may be coupled to the first groove 141a of the motor pulley 141, and the slip prevention member 149b may be provided to protrude in a radial direction than an outer circumferential surface of the motor pulley 141. The protruding portion of the slip prevention member 149b may be inserted and rotated along the second groove 143a of the belt 143. Therefore, slip between the motor pulley 141 and the belt 143 can be prevented by the slip prevention member 149b provided between the first groove 141a of the motor pulley 141 and the second groove 143a of the belt 143.

FIGS. 4 and 5 show that only the nut pulley 145 is provided with a first groove 145a, and an slip prevention member 149a coupled thereto is provided, or only the motor pulley 141 is provided with a first groove 141a, and a slip prevention member 149b coupled thereto is provided, but is not limited thereto.

Referring to FIG. 6, first grooves 141a and 145a may be provided in each of the motor pulley 141 and the nut pulley 145. Slip prevention members 149a and 149b may be coupled to each of the first groove 141a of the motor pulley 141 and the first groove 145a of the nut pulley 145. Each of the slip prevention members 149a, 149b can be rotated by being inserted along the second groove 143a provided in the belt.

The slip between the motor pulley 141 and the belt 143 is prevented by the slip prevention member 149b provided between the first groove 141a of the motor pulley 141 and the second groove 143a of the belt 143. The slip between the nut pulley 145 and the belt 143 may be prevented by the slip prevention member 149a provided between the first groove 145a of the nut pulley 145 and the second groove 143a of the belt 143.

The slip prevention member 149b coupled to the first groove 141a of the motor pulley 141 and the slip prevention member 149a coupled to the first groove 145a of the nut pulley 145 may have different diameters, but may have the same shape, structure, and material.

FIGS. 7 and 8 are examples of the shape of the slip preventing member 149. It may be applied to both the slip prevention member 149b coupled to the first groove 141a of the motor pulley 141 and the slip prevention member 149a coupled to the first groove 145a of the nut pulley 145.

Referring to FIGS. 7 and 8, the slip preventing member 149 may be provided with a protruding support protrusion 149c. The shape of the protruding support protrusion 149c may be a hemispherical shape as shown in the drawings, but is not limited thereto. For example, the shape of the support protrusion 149c may be a rectangular or rhombus tile shape, a conical shape or a polygonal pyramid shape, or a combination of two or more selected from a hemisphere, a tile, a cone, and a polygonal pyramid group. The support protrusion 149c of the slip preventing member 149 may increase the frictional force of the contact surface.

At least two or more support protrusions 149c of the slip prevention member 149 may be provided. For example, three support protrusions 149c are provided, and the angle between one of the support protrusions 149c and the adjacent support protrusions 149c may be disposed at a 120 degree interval from the center of the slip prevention member 149. In this case, the support protrusion 149c of the slip preventing member can stably support the contacting support surface. However, the present embodiments are not limited thereto, and the angle formed by each of the support protrusions 149c with the neighboring protrusions 149c may be different from each other. As the number of the support protrusions 149c of the slip prevention member increases, the friction force of the contact surface may be further increased.

The plurality of support protrusions 149c may be provided to be spaced apart from each other in the longitudinal direction of the slip prevention member 149. The slip prevention member 149 may be provided with a portion without the protruding support protrusion 149c and the protruding support protrusion 149c alternately. The portion without the protruding support protrusion 149c prevents slip between the nut pulley 145 or the motor pulley 141 and the belt 143, and the support protrusion 149c protruding from the slip prevention member 149 may increase the frictional force of the contact surface to prevent tooth jump between the nut pulley 145 or the motor pulley 141 and the belt 143.

The plurality of support protrusions 149c may be provided by connecting adjacent support protrusions 149c to each other. In this case, the support protrusion 149c may maximize the frictional force of the contact surface. The connected support protrusion 149c prevents slip between the nut pulley 145 or the motor pulley 141 and the belt 143, and prevents tooth jump between the nut pulley 141 or the motor pulley 141 and the belt 143 with maximum frictional force.

Referring to FIG. 9, the support protrusion 149c is provided on the outer circumferential surface of the slip preventing member 149b, and there may be no support protrusion on the inner circumferential surface of the slip preventing member 149. The inner circumferential surface of the slip prevention member 149b may be fitted and coupled to the first groove 141a of the motor pulley 141. The support protrusion 149c provided on the outer circumferential surface of the slip prevention member 149b may be inserted along the second groove 143b of the belt 143. The frictional force with the belt 143 is increased by the support protrusion 149c provided on the outer circumferential surface of the slip prevention member 149b to prevent tooth jump between the motor pulley 141 and the belt 143.

A first insertion groove 143b into which the support protrusion 149c is inserted may be provided in the second groove 143a of the belt 143. The first insertion groove 143b may be provided in a shape complementary to that of the outer circumferential support protrusion 149c of the slip prevention member 149b. The first insertion groove 143b may be formed by forming the second groove 143a of the belt 143 and processing it again so that the insertion groove 143b is provided in the second groove 143a. However, the present invention is not limited thereto, and the second groove 143a and the first insertion groove 143b may be simultaneously formed in the belt 143.

The support protrusion 149c provided on the outer circumferential surface of the slip prevention member 149b has a structure engaged with the first insertion groove 143b provided in the second groove 143a of the belt 143, so that the contact area between the support protrusion 149c and the first insertion groove 143b increases and frictional force may be further increased.

The slip between the motor pulley 141 and the belt 143 is prevented by the slip prevention member 149b provided between the first groove 141a of the motor pulley 141 and the second groove 143a of the belt 143. The frictional force between the support protrusion 149c provided on the outer circumferential surface of the slip prevention member 149b and the first insertion groove 143b provided in the second groove 143a of the belt 143 is increased, and the tooth jump between the motor pulley 141 and the belts 143 can be further prevented.

FIG. 9 shows that the support protrusion 149c is provided on the outer circumferential surface of the slip prevention member 149b, but is not limited thereto.

Referring to FIG. 10, the support protrusion 149c is provided on the inner circumferential surface of the slip preventing member 149b, and the outer circumferential surface of the slip preventing member 149b may have no supporting protrusion. The support protrusion 149c provided on the inner circumferential surface of the slip prevention member 149b may be inserted into the first groove 141a and coupled thereto. The outer peripheral surface of the slip prevention member 149b may be inserted along the second groove 143a of the belt 143. The frictional force with the motor pulley 141 may be increased by the support protrusion 149c provided on the inner circumferential surface of the slip prevention member 149b, so that the coupling force between the slip prevention member 149b and the motor pulley 141 may be increased.

A second insertion groove 141b into which the protrusion is inserted may be provided in the first groove 141a of the motor pulley 141. The second insertion groove 141b may be provided in a shape complementary to that of the support protrusion 149c provided on the inner circumferential surface of the slip prevention member 149b. The first groove 141a and the second insertion groove 141b may be formed sequentially or simultaneously.

The support protrusion 149c provided on the inner circumferential surface of the slip prevention member 149b has an engaging structure in the second insertion groove 141b provided in the first groove 141 of the motor pulley 141. Accordingly, the contact area between the support protrusion 149c and the second insertion groove 141b increases, so that the coupling force between the slip prevention member 149b and the motor pulley 141 may be further increased.

The slip between the motor pulley 141 and the belt 143 by the slip prevention member 149b provided between the first groove 141a of the motor pulley 141 and the second groove 143b of the belt 143 is prevented. Since the coupling force between the support protrusion 149c and the second insertion groove 141b of the slip prevention member 149b is increased, and the contact friction force between the motor pulley 141 and the belt 143 is increased, so the motor pulley 141 and the belt 143) between the tooth jump phenomenon can be further prevented.

FIGS. 9 and 10 illustrate that the support protrusion 149c provided on the slip prevention member 149b is provided on the outer circumferential surface or the inner circumferential surface, but is not limited thereto.

Referring to FIG. 11, the support protrusion 149c may be provided on both the outer peripheral surface and the inner peripheral surface of the slip preventing member 149b. The support protrusion 149c-1 on the outer circumferential surface of the slip preventing member 149b increases the frictional force with the second groove 143a of the belt 143, and the support protrusion 149c-2 on the inner circumferential surface of the slip preventing member 149b increases the coupling force with the first groove 141a of the motor pulley 141.

The first groove 141a of the motor pulley 141 is provided with a second insertion groove 141b into which the support protrusion 149c-2 of the inner circumferential surface of the slip prevention member 149b is inserted, and the second groove 143a of the belt 143 may be provided with a first insertion groove 143b into which the support protrusion 149c-1 of the outer circumferential surface of the slip prevention member 149b is inserted. The support protrusion 149c-1 on the outer peripheral surface of the slip prevention member 149b has an engaging structure with the first insertion groove 143b, and the support protrusion 149c-2 on the inner circumferential surface of the slip prevention member 149b may have an engaging structure with the second insertion groove 141b.

The Slip between the motor pulley 141 and the belt 143 is prevented by the slip prevention member 149b provided between the first groove 141a and the second groove 143a. The tooth jump between the motor pulley 141 and the belt 143 may be further prevented due to an increase in frictional force between the support protrusion 149c-1 on the outer circumferential surface and the first insertion groove 143b and an increase in coupling force between the support protrusion 149c-2 and the second insertion groove 141b on the inner circumferential surface.

The present embodiments described with reference to FIGS. 9 to 11 is not limited to the case in which the first groove 141a formed in the motor pulley 141 and the anti-slip member 149b coupled thereto are provided. For example, it may be applied when the first groove 145a formed only in the nut pulley 145 and the slip prevention member 149a coupled thereto are provided. Alternatively, the above embodiments may be applied even when the slip prevention members 149a and 149b are coupled to the first grooves 141a and 145a formed in the motor pulley 141 and the nut pulley 145, respectively.

The slip prevention members 149a and 149b may be made of an elastic material. The elastic material may be a rubber, urethane, Teflon, or silicone material. For example, elastic materials include NR (Natural Rubber), NBR (Nitrile Butadiene Rubber), CR (Chloroprene Rubber), EPDM (Ethylene Propylene Terpolymer), FPM (Fluoro Rubber), SBR (Styrene Butadine Rubber), CSM (Chlorosulphonated Polyethylene), urethane, Teflon, silicone, etc. to increase the frictional force between the anti-slip members (149a, 149b) and the contact surface, it is possible to absorb vibration.

Referring to FIG. 12, the belt-type transmission 140 includes a driving motor 121 controlled by an electronic control unit (ECU), a motor pulley 141 fixed to the shaft of the drive motor 121, a belt 143 wound around the motor pulley 141, a ball nut 147 for supporting the rack bar 170 in the inside of the rack housing 170 surrounding the rack bar 130, a nut pulley 145 coupled to the outer circumferential surface of the ball nut 147. The ball nut 147 is coupled to the rack bar 130 through a ball and rotates to slide the rack bar 130 from the inside of the rack housing 170, and a bearing 180 for supporting rotation of the ball nut 147 is mounted on the outer peripheral surface of the ball nut 147.

The slip prevention member 149b coupled to the first groove 141a provided in the motor pulley 141 and the slip prevention member 149a coupled to the first groove 145a provided in the nut pulley 145 is a belt (143) is inserted into the second groove (143a) provided to rotate.

Referring to FIG. 12, a fixing member 144 for supporting the nut pulley 145 in the axial direction may be coupled to at least one of one end and the other end of the ball nut 147. The fixing member 144 is disposed in the axial direction of the ball nut 147 and may be coupled to the groove formed on the outer circumferential surface. The left and right movement of the nut pulley 145 is restricted by the fixing member 144, thereby further preventing slip between the nut pulley 145 and the belt 143.

The fixing member 144 may be a wave washer. The wave washer may include all elastic supports having a wavy shape in both directions of the nut pulley 145. The wave washer may absorb vibration generated during the rotation operation of the nut pulley 145 and reduce rattle noise.

According to the present embodiments, there may be provided a steering apparatus for a vehicle that prevents the left and right movement of the belt due to the slip of the belt and prevents the tooth jump between the motor pulley or the nut pulley and the belt. According to the present embodiments, there may be provided a steering apparatus for a vehicle capable of increasing a driver's steering feeling by reducing vibration and rattle noise generated during operation of the nut pulley.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering apparatus for vehicle, comprising:
   a motor pulley coupled to a rotation shaft of a driving motor;
   a nut pulley coupled to an outer circumferential surface of a ball nut;
   a belt connecting the motor pulley and the nut pulley;
   a first groove provided on an outer peripheral surface of at least one of the motor pulley and the nut pulley;
   a second groove provided on an inner surface of the belt at a position opposite to the first groove; and
   a slip preventing member coupled to the first groove and provided with at least one support protrusion.

2. The steering apparatus for vehicle of claim 1, wherein the slip preventing member is formed in a ring shape and is fitted into the first groove.

3. The steering apparatus for vehicle of claim 1, wherein the at least one support protrusion comprises a plurality of support protrusions.

4. The steering apparatus for vehicle of claim 3, wherein the plurality of support protrusions are disposed to be spaced apart from each other in a longitudinal direction of the slip preventing member.

5. The steering apparatus for vehicle of claim 3, wherein the plurality of support protrusions are arranged to be connected to each other with adjacent support protrusions of the plurality of support protrusions.

6. The steering apparatus for vehicle of claim 3, wherein the plurality of support protrusions are provided on an outer peripheral surface of the slip preventing member.

7. The steering apparatus for vehicle of claim 6, wherein a first insertion groove into which at least one of the plurality of support protrusions is inserted is provided in the second groove.

8. The steering apparatus for vehicle of claim 1, wherein the plurality of support protrusions are provided on an inner circumferential surface of the slip preventing member.

9. The steering apparatus for vehicle of claim 8, wherein a second insertion groove into which at least one of the plurality of support protrusions is inserted is provided in the first groove.

10. The steering apparatus for vehicle of claim 1, wherein the support protrusion is disposed on both an outer peripheral surface and an inner peripheral surface of the slip preventing member.

11. The steering apparatus for vehicle of claim 10, wherein the first groove is provided with a second insertion groove into which the support protrusion disposed on an inner circumferential surface of the slip prevention member is inserted, and the second groove is provided with a first insertion groove into which the support protrusion disposed on an outer circumferential surface of the slip prevention member is inserted.

12. The steering apparatus for vehicle of claim 1, wherein the slip prevention member is formed of an elastic material.

13. The steering apparatus for vehicle of claim 1, wherein a fixing member for supporting the nut pulley in an axial direction is coupled to at least one of one end and another end of the ball nut.

14. The steering apparatus for vehicle of claim 13, wherein the fixing member is a wave washer.

15. A steering apparatus for vehicle, comprising:
- a motor pulley coupled to a rotation shaft of a driving motor;
- a nut pulley coupled to an outer circumferential surface of a ball nut;
- a belt connecting the motor pulley and the nut pulley;
- a first groove provided on an outer peripheral surface of at least one of the motor pulley and the nut pulley;
- a second groove provided on an inner surface of the belt at a position opposite to the first groove; and
- a slip preventing member coupled to the first groove,
- wherein the slip preventing member is integrally fused along the first groove.

* * * * *